(12) United States Patent
Watkins

(10) Patent No.: US 10,056,713 B2
(45) Date of Patent: Aug. 21, 2018

(54) CHARGER EXTENSION FOR ELEVATED DEVICES

(71) Applicant: Method Lights, LLC, Knoxville, TN (US)

(72) Inventor: Barton W. Watkins, Knoxville, TN (US)

(73) Assignee: Method Lights, LLC, Knoxville, TN (US)

( * ) Notice: Subject to any disclaimer, the term of this patent is extended or adjusted under 35 U.S.C. 154(b) by 0 days.

(21) Appl. No.: 15/411,053

(22) Filed: Jan. 20, 2017

(65) Prior Publication Data

US 2017/0214175 A1    Jul. 27, 2017

Related U.S. Application Data

(60) Provisional application No. 62/281,904, filed on Jan. 22, 2016.

(51) Int. Cl.
*H01R 13/62* (2006.01)
*H02J 7/00* (2006.01)
*H01R 43/26* (2006.01)

(52) U.S. Cl.
CPC ......... *H01R 13/6205* (2013.01); *H01R 43/26* (2013.01); *H02J 7/0052* (2013.01)

(58) Field of Classification Search
CPC .................................................. H01R 13/6205
USPC ............. 439/39; 248/346.01, 346.03, 346.06
See application file for complete search history.

(56) References Cited

U.S. PATENT DOCUMENTS

| | | | | |
|---|---|---|---|---|
| 3,096,029 A | * | 7/1963 | Birger | F21S 8/086 248/291.1 |
| 3,808,577 A | * | 4/1974 | Mathauser | H01R 13/6205 439/180 |
| 3,810,258 A | * | 5/1974 | Mathauser | H01R 13/6205 439/246 |
| 4,669,769 A | * | 6/1987 | Polder, Jr. | B25B 7/12 294/111 |
| 5,401,175 A | * | 3/1995 | Guimond | H01R 13/6205 439/38 |
| 5,617,079 A | * | 4/1997 | Harrison | G08B 17/00 340/628 |

(Continued)

*Primary Examiner* — Hae Moon Hyeon
*Assistant Examiner* — Peter G Leigh
(74) *Attorney, Agent, or Firm* — Knox Patents; Thomas A. Kulaga

(57) ABSTRACT

Apparatus for an extension system that enables connecting a charger or power source to an electrical device that is mounted at a location not readily accessible without requiring an assistive device. The system includes an extension device and an extension cable. The extension device includes a pole with a holder. The extension cable has a cable connector that is received by the holder. The holder includes a window allowing an operator to see an indicator associated with the electrical device. The cable connector is one half of a connector assembly. The other half of the connector assembly is connected to the electrical device. The two connectors have a magnetically attraction that pulls the connector halves together to form an electrical connection. The connector assembly disengages upon application of a tugging or pulling force greater than that attributed to the weight of the extension cable dangling from the rechargeable device.

15 Claims, 2 Drawing Sheets

(56) References Cited

U.S. PATENT DOCUMENTS

| | | | | |
|---|---|---|---|---|
| 6,249,960 B1* | 6/2001 | Faesel | H01R 43/22 | |
| | | | 29/750 | |
| 6,966,781 B1* | 11/2005 | Bullinger | H01R 13/6205 | |
| | | | 439/289 | |
| 7,604,370 B2* | 10/2009 | Dowdy | F21S 9/02 | |
| | | | 362/199 | |
| 7,607,920 B1* | 10/2009 | Chen | H01R 31/06 | |
| | | | 439/39 | |
| 7,637,746 B2* | 12/2009 | Lindberg | H01R 13/6205 | |
| | | | 439/38 | |
| 7,772,801 B2* | 8/2010 | Dowdy | F21S 9/02 | |
| | | | 320/107 | |
| 7,927,126 B1* | 4/2011 | Bender | H01J 37/04 | |
| | | | 439/369 | |
| 8,358,101 B2* | 1/2013 | Dowdy | F21S 9/02 | |
| | | | 320/107 | |
| 8,602,795 B2* | 12/2013 | Hsu | H01R 13/6205 | |
| | | | 439/39 | |
| 9,133,994 B2* | 9/2015 | Dowdy | F21S 8/04 | |
| 9,570,843 B2* | 2/2017 | Lin | H01R 13/6205 | |
| 2006/0114087 A1* | 6/2006 | Deng | H01R 13/6205 | |
| | | | 335/205 | |
| 2010/0144164 A1* | 6/2010 | Wang | H01R 13/6205 | |
| | | | 439/39 | |
| 2015/0364862 A1* | 12/2015 | Lin | H01R 13/6205 | |
| | | | 439/39 | |
| 2016/0013582 A1* | 1/2016 | Byrne | H01R 13/2421 | |
| | | | 439/39 | |

\* cited by examiner

CHARGER EXTENSION FOR ELEVATED DEVICES

CROSS-REFERENCE TO RELATED APPLICATIONS

Statement Regarding Federally Sponsored Research or Development

Not Applicable

BACKGROUND

1. Field of Invention

This invention pertains to battery charging systems. More particularly, this invention pertains to a system that allows connecting a battery charger to an elevated battery operated device, such as a ceiling mounted light with rechargeable batteries.

2. Description of the Related Art

Many electrical and electronic devices thrive on batteries, and, in particular, rechargeable batteries. For portable devices, rechargeable batteries are convenient because they are easily recharged by manually plugging in a charging cable as the device is held in a hand. But it is not as convenient to use rechargeable batteries for electrical and electronic devices that are not portable and/or not easily accessed. One such device is a light, such as used for illuminating fine art, that is typically mounted on a ceiling or high on a wall. Unless special wiring is routed to such a light, a ladder must be used to access the light to replace or recharge the batteries.

BRIEF SUMMARY

According to one embodiment of the present invention, a charger extension system is provided. The charger extension system includes an extension device and an extension cable that is releasably supported by the extension device. The extension device includes a pole with a cable holder. The extension cable includes a first connector that is one-half of a zero or near zero insertion force connector assembly. The other half of the zero insertion force connector assembly is on a rechargeable device that is mounted at a location that is inaccessible without using an assistive device, such as a stepstool or ladder. In this way the problem of how to connect a charger to a rechargeable device that is mounted at a location out of reach of person is solved.

The cable holder relies on gravity to support the extension cable. The cable holder includes a viewing window through which the rechargeable device is visible, for example, an indicator on the rechargeable device is visible while attempting to connect the charging cable to the rechargeable device. The cable holder is attached to an end of the pole of the extension device. In one embodiment the pole is a long, slender rod. In another embodiment the pole is extendable, such as by telescoping multiple members.

The connector assembly includes a first connector and a second connector. The first connector has a conductor that is a central prong that is spring loaded. The prong is surrounded by another conductor. In one embodiment the second conductor is a magnet. In another embodiment, a magnet is coaxial with said prong and second conductor. The second connector has a recess with a conductor. The recess is surrounded by another conductor. A magnet is coaxial with the recess and second conductor. Magnetic attraction between the two magnets attracts the first connector to the second connector whereby the prong engages the recess and the two second conductors mate, thereby making an electrical connection between the first and second connectors.

In one embodiment, the first connector is part of the extension cable and the second connector is part of the rechargeable device. In another embodiment, the first connector is part of the rechargeable device and the second connector is part of the extension cable. In yet other embodiments, the first connector and/or the second connector are adapters having an end configured to engage a conventional connector with the first connector and/or second connector exposed to mate with the other.

BRIEF DESCRIPTION OF THE SEVERAL VIEWS OF THE DRAWINGS

The above-mentioned features will become more clearly understood from the following detailed description read together with the drawings in which.

DETAILED DESCRIPTION

Apparatus for a charger or power extension system 100 is disclosed. The extension system 100 allows a battery charger or power supply 118 to be readily connected to a rechargeable device 102 mounted out of arms-reach.

Figure 1:
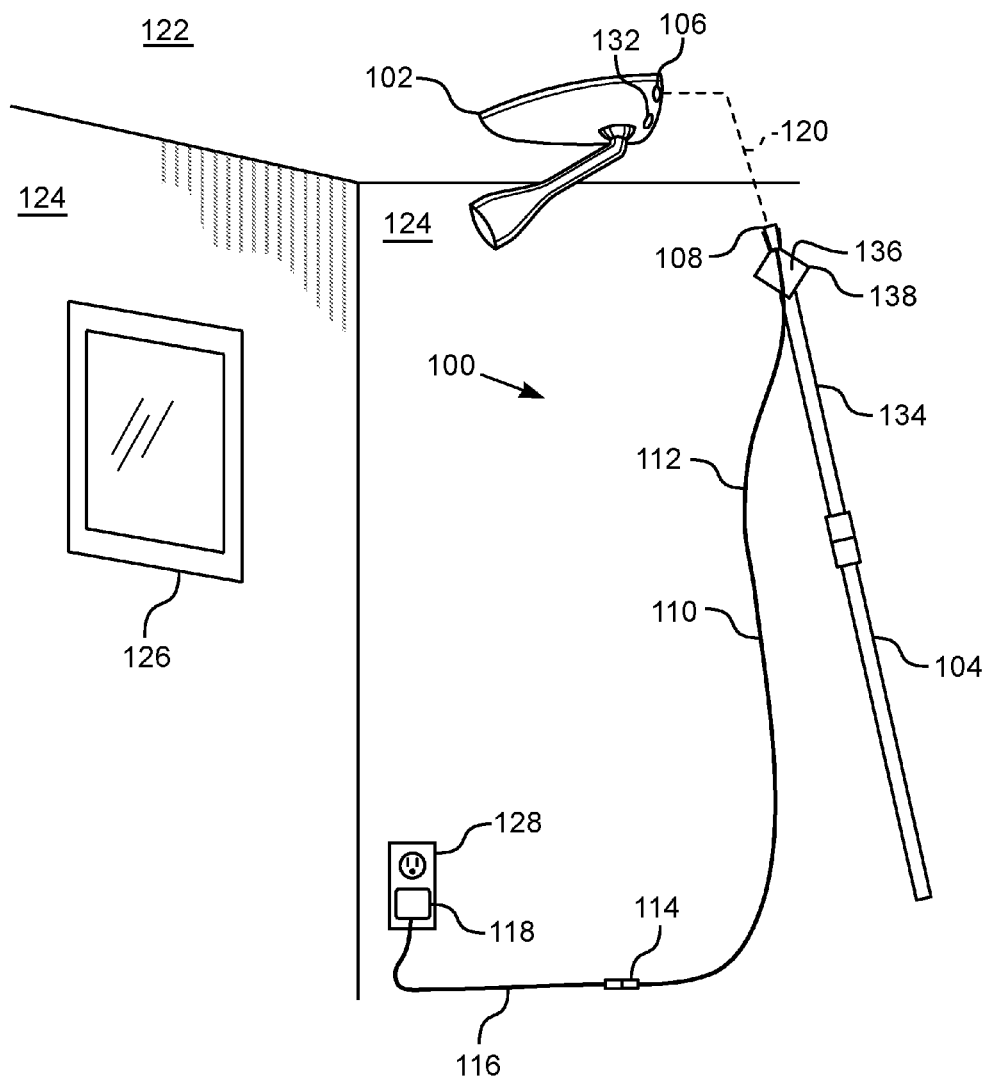
FIG. 1 is a perspective view of one embodiment of a charger extension system.

FIG. 1 illustrates a perspective view of one embodiment of the extension system 100 as it would be used to connect a charging or extension cable 110 to a rechargeable device 102 mounted on a ceiling 122 or elevated surface. The rechargeable device 102 is a battery operated luminaire in which the batteries are rechargeable. In the illustrated embodiment the rechargeable device 102 includes a power indicator 132 such as an LED or other illuminator that indicates when external power is applied to the device 102. In many cases the indicator 132 provides information on the charging status of the rechargeable device 102. For example, the indicator 132 is dark when the device 102 is operating normally, blinks when the rechargeable device 102 requires charging, glows amber or red while charging, and glows green when the device 102 is fully charged.

The illustrated luminaire 102 is mounted on a ceiling 122 and is directed toward an object 126, such as a picture or painting mounted on a wall 124, as illustrated, or a sculpture or other piece of fine art on the floor or a pedestal. In other embodiments the rechargeable device 102 is a security sensor, such as a motion detector, or a smoke or fire alarm. The rechargeable device 102 is mounted at a height that is not easily reached without assistance, such as by using a stepstool or a ladder.

The illustrated embodiment of the charger extension system 100 includes an extension device 104 and an extension cable 110. The extension device 104 includes a pole 134 and a cable holder 138. The pole 134 is configured with a handle on one end and the cable holder 138 at the opposite end. In the illustrated embodiment the pole 134 is extendable by telescoping sections. In this way the reach of a person holding the pole 134 is extended so that the end with the cable holder 138 reaches the rechargeable device 102 that is mounted on a ceiling 122 or is otherwise out of reach of the person. The cable holder 138 has an opening 136 through which a power light 132 and or connector 106 is visible when the cable holder 138 is positioned next to the rechargeable device 102. In this way the person is able to guide the extension device 104 and verify that a power connection to the rechargeable device 102 has been made successfully.

In the illustrated embodiment the cable holder 138 is attached to the end of the pole 134 with an orientation such that the cable connector 108 is readily connected to a device 102 that is overhead, such as on a ceiling 122. In another embodiment the cable holder 138 is rotated or otherwise attached to the end of the pole 134 with an orientation such that the cable connector 108 is readily connected to a device 102 that is horizontally out of reach of the person. For example, the rechargeable device 102 is mounted to a wall 124 and the device 102 is only accessible from a walkway adjacent the device 102.

The extension cable 110 includes a first connector 108 at one end of a cable 112. In the illustrated embodiment another connector 114 at the other end of the cable 112 connects to a charging cable 116 extending from a battery charger 118. The battery charger 118 plugs into a wall receptacle 128 and provides power intended to charge the rechargeable device 102. In another embodiment the cable 112 is attached directly to the battery charger 118.

The first connector 108 of the extension cable 110 is one-half of a connector assembly. The other half of the connector assembly is the charging connector 106 on the rechargeable device 102. The connector assembly 108, 106 has two features that enable the charger extension system 100. The first feature is that the connector assembly 108, 106 requires a zero or a low-insertion force for the first connector 108 to mate with the second connector 106. Conventional connectors require the connector assembly halves to be pushed together, which requires overcoming the friction that also secures the halves together. A low-insertion force connector assembly requires a minimal force for the two connectors 108, 106 to mate. A zero insertion force connector assembly requires no positive force to mate the two connectors 108, 106. A zero insertion force connector assembly includes connectors 108, 106 that are pulled together or attracted to each other such that an electrical connection is formed without an outside force being applied to push the two connectors 108, 106 together to form an electrical connection. In one embodiment, the charger extension system 100 has a connector assembly 108, 106 that does not require a pushing force to mate the connector halves 108, 106. Instead, a magnetic force pulls the two connectors together 108, 106 with enough pulling force to align the connectors 108, 106 and hold them together in electrical connection.

The second feature is that the connector assembly 108, 106 is releasable by a slight tugging or pulling force in a direction normal to the axis of the connector assembly 108, 106, with the required separating force being greater than the force exerted through gravity on the extension cable 110. That is, the weight of the extension cable 110 dangling from the charger connector 106 is not sufficient to disengage the first connector 108 from the charging connector 106. A slight tug on the cable 110 hanging at a right angle from the first connector 108, however, is sufficient to disengage the first connector 108 from the second connector 106. The force required to separate the first connector 108 from the second connector 106 is less than the force required to separate conventional connectors that rely upon friction to maintain connection.

The first connector 108 of the extension cable 110 rests on the cable holder 138 at one end of the extension device 104. The first connector 108 is moved by a person holding the extension device 104. The first connector 108 is moved along a path 120 to the charging connector 106 on the rechargeable device 102. The window 136 in the cable holder 138 permits the person moving the extension device 104 to see the indictor 132 on the rechargeable device 102 as the cable holder 138 is moved next to the charging connector 106. Observing the indicator 132 through the window 136 allows the person to determine if the first connector 108 is aligned and connected with the charging connector 106. In this way the first connector 108 is mated with the charging connector 106 when the person is not able to reach the rechargeable device 102 without the assistance of a stepstool or ladder. After the first connector 108 is mated with the charging connector 106, the extension device 104 is lowered slightly to disengage the first connector 108 from the extension device 104. The extension cable 110 dangles from the rechargeable device 102 while being attached by way of the mated connectors 108, 106. When the indicator 132 shows that the rechargeable device 102 is fully charged or when the person determines that sufficient time has elapsed, the dangling cable 110 is pulled or tugged away from the rechargeable device 102, thereby causing the first connector 108 to disengage from the charging connector 106 and fall away from the rechargeable device 102.

Figure 2:
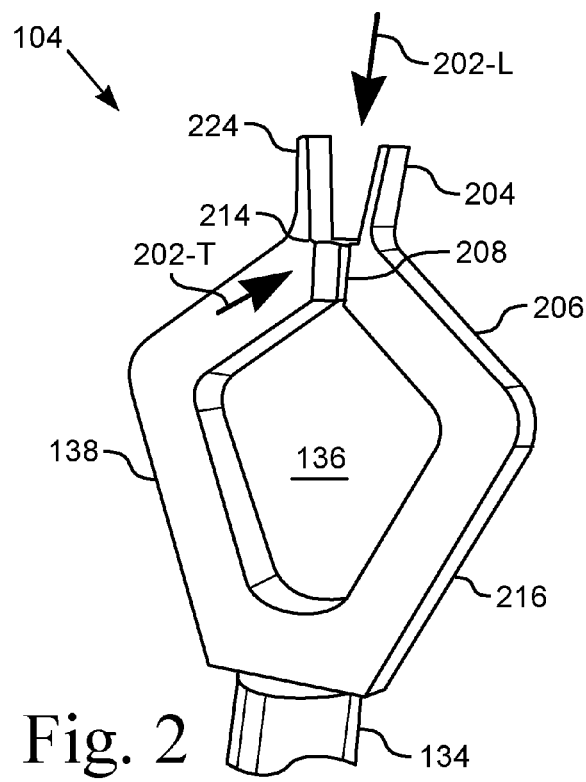
FIG. 2 is a perspective view of one embodiment of a cable holder.
Figure 3:
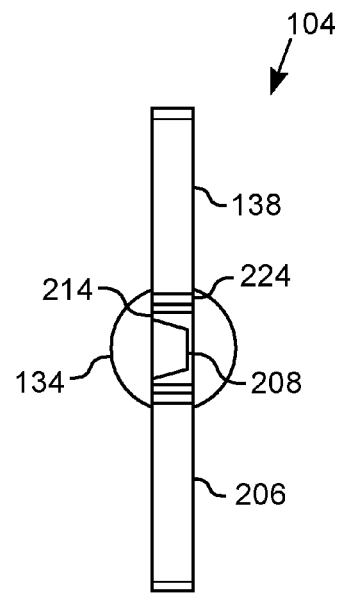
FIG. 3 is a top plan view of the cable holder of FIG. 2.

FIG. 2 illustrates a perspective view of one embodiment of a cable holder 138. FIG. 3 illustrates a top plan view of the cable holder 138 of FIG. 2. The cable holder 138 includes a body 206 and a receiver 204. In the illustrated embodiment, one end of the body 206 is attached to the pole 134 and the other end of the body 206 has the receiver 204.

The body 206 of the cable holder 138 has members 216 that define a window 136. In the illustrated embodiment, the body 206 has a configuration in which the window 136 is enclosed and aligned with the longitudinal axis of the pole 134. In other embodiments the body 206 has a configuration where the window 136 is open on one or more sides with the members 216 having either a partial polygonal shape or an L-shape configuration. In any case, the window 136 allows a viewport for a person operating the charger extension system 100 to see a portion of the rechargeable device 102 as the connectors 108, 106 are being mated.

In yet other embodiments, the receiver 204 is attached directly to the pole 134, that is, the cable holder 138 does not include the body 206, or the cable holder 138 does not have a window 136. Such embodiments are useful for the case where the rechargeable device 102 is out of reach horizontally and the indictor 132 is not blocked by the extension device 104 when the connector 108 is being connected to the rechargeable device 102. In such a case the window 136 is not necessary to ensure engagement of the connectors 108, 106 because the indicator 132 is visible during engagement and not blocked by the extension device 104.

The receiver 204 includes a pair of sidewalls 224, a ledge 214, and a channel 208. The configuration of the receiver 204 is such that the first connector 108 of the extension cable 110 fits between the sidewalls 224 with the ledge 214 supporting the bottom of the connector 108, and the channel 208 receiving the cable 112 extending from the connector 108. The first connector 108 loosely fits into the receiver 208 and is held in place by gravity with the weight of the extension cable 110 supported by the ledge 214.

The receiver 204 receives the connector 108 in the longitudinal direction 202-L and in the transverse direction 202-T that is perpendicular to the plane of the cable holder body 206. The connector 108 is insertable and releasable at any angle between those two directions 202-L, 202-T.

Figure 4:
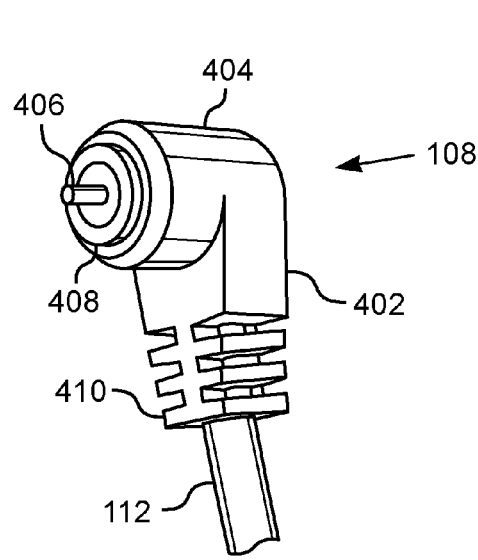
FIG. 4 is a perspective view of one embodiment of a cable end with a connector.
Figure 5:
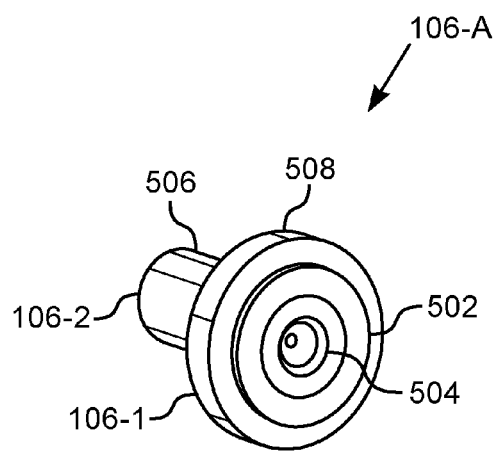
FIG. 5 is a perspective view of one embodiment of a charging connector.

FIG. 4 illustrates a perspective view of one embodiment of a cable 112 with the first connector 108. FIG. 5 illustrates a perspective view of one embodiment of an adaptor that is a charging connector 106-A. Together, the illustrated first connector 108 and the illustrated charging connector 106-A define one embodiment of a connector assembly 108, 106-A. The adapter 106-A includes a first end, or connector 106-1, and an opposite, second end, or connector 106-2. The adapter 106-A is configured for the first connector 106-1 to mate with the first connector 108 and the second connector 106-2 to mate with a conventional connector, such as a barrel connector. In this way, the adapter 106-A is the connector that mates with the first connector 108.

The first connector 108 includes a connector body 404 that includes a pair of sidewalls 402. The connector body 404 houses and supports a first conductor 406 and a second conductor 408. The first conductor 406 is spring-loaded. The second conductor 408 is also a magnet 408. The sidewalls 402 are not parallel. The sidewalls 402 have a configuration that complements the sidewalls 224 of the receiver 204. In the illustrated embodiment, the connector sidewalls 402 have a partial V-shape that corresponds to the angled receiver sidewalls 224 that spread out as they extend from the body 206. The connector sidewalls 402 include opposing sides of the strain-relief 410. The cable 112 extends away from the strain-relief 410 and the connector 108. The bottom of the strain-relief 410 is sized and configured to rest on the ledge 214 of the receiver 204. The cable 112 extends at right angles or normal to the axis of the connector 108 defined by the first conductor 406.

In another embodiment, the conductors 406, 408 are the exposed part of an adapter that engages a conventional connector in said connector body 404. Such an embodiment is the mirror-image of the second connector 106-A shown in FIG. 5. In this way, the adapter converts a conventional connector into the first connector 108, which is then suitable for connection to the second connector 106, 106-A.

The illustrated embodiment of the charger connector, or adapter, 106-A includes a magnet 508, a first conductor 502, a second conductor 504, and a barrel 506. The magnet 508 and first and second conductors 502, 504 form the first connector 106-1 of the adapter 106-A. The first conductor 502 is a ring configured to mate with the second conductor 408 of the first connector 108. The second conductor 504 is a recessed dimple configured to receive the prong-like conductor 406 of the first connector 108. The magnet 508 interacts with the magnet 408 to pull the first connector 108 toward the adapter 106-A. In one embodiment, the magnet 508 has a donut or ring shape that fits over the barrel 506 and butts against the first conductor 502. In such an embodiment, the magnet 508 is sandwiched between the first conductor 502 and the device 102.

The barrel 506 is part of the second connector 106-2 of the adapter 106-A. In the illustrated embodiment, the barrel 506 is configured to be inserted into a conventional barrel-style power connector. In this way the charger connector 106-A converts a rechargeable device 102 with a conventional charging connector into a rechargeable device 102 with a charging connector 106 suitable for use with the charger extension system 100. In another embodiment the first connector end 106-2 of the adapter 106-A is hardwired into the battery circuit of the rechargeable device 102. In such an embodiment, the barrel 506 is not needed because there is no corresponding conventional connector for the barrel 506 to mate with.

In another embodiment, the first conductor 406 protrudes from the charging connector 106-A and the recess with the second conductor 504 is on the first connector. That is, the structure of the two connectors 108, 106 is swapped such that the exposed, first conductor 406 is associated with the device 102, not the cable 110.

The illustrated connector assembly 108, 106-A relies upon magnetic force to engage and secure the connectors 108, 106-A. In one embodiment, the first connector 108 has a first magnet 408 and the charging connector 106-A has a second magnet 508. The two magnets 408, 508 are polarized such that they attract each other when the two connectors 108, 106-A are brought together. The magnetic attraction between the two magnets 408, 508 aligns the conductors of each connector 108, 106-A so that an electrical connection is made. In the illustrated embodiment, the two magnets 408, 508 are rings that are concentric with the first conductor 406 and the second conductor 504, respectively. The ring-shaped magnets 408, 508 ensure that the first conductor 406 is aligned with the second conductor 504 as the magnets 408, 508 pull the first and second connectors together. In other embodiments, only one of the first connector 108 or the charger connector 106-A includes the magnet 408, 508 and the other one of the first connector 108 or the charger connector 106-A has a component that is attracted by the magnet 408, 508.

The illustrated embodiment of the connector assembly 108, 106-A relies on magnetic attraction to achieve the zero or minimal insertion force and disengagement feature. Those skilled in the art will recognize that other types of connector assemblies that require no or minimal insertion force for engagement can be used without departing from the spirit and scope of the present invention.

The charger extension system 100 includes various functions. The function of mating connectors 108, 106, 106-1 with low-insertion force is implemented, in various embodiments, by the first connector 108 and the charging connector 106, 106-1, such as illustrated in FIGS. 4 and 5, which includes a prong-type connector 406 engaging a connector 504 with a recess, and the two connectors 108, 106, 106-1 being pulled together by magnetic attraction.

The function of elevating a first connector 108 to engage a remote connector 106, 106-1 is implemented, in one embodiment, by the extension device 104 and an extension cable 110.

From the foregoing description, it will be recognized by those skilled in the art that a charger or power extension system 100 has been provided. The extension system 100 includes an extension device 104 and an extension cable 110. The extension device 104 includes a pole 134 and a cable holder 138 for the extension cable 110. The extension cable 110 includes a connector 108 that requires a zero or low-insertion force to mate with a connector on the device 102 to be powered through the extension cable 110. In one embodiment, a charging connector 106-A is an adapter with one end configured to mate with an existing, convention power input connector on the device 102 and the other end configured to mate with the connector 108 connected to the extension cable 110.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for connecting an electrical cable to an electrical device, said apparatus comprising:
   a first connector configured to make an electrical connection to the electrical device, said first connector having a zero-insertion force when mating with a second connector associated with the electrical device;
   a cable electrically connected to said first connector;
   a holder releasably holding said first connector with said first connector positioned such that said first connector mates with said second connector when said holder is positioned proximate said second connector, said holder having a receiver configured to engage a portion of a connector body of said first connector, said first connector releasably secured in said receiver by a weight of said first connector and a portion of said cable suspended from said first connector, said receiver releasing said first connector when said first connector is electrically connected to said second connector, said receiver including a pair of sidewalls, and, when said portion of said connector body is engaging said receiver, said pair of sidewalls are engaging said portion of said connector body therebetween, said receiver including a channel extending away from said pair of sidewalls, and, when said portion of said connector body is engaging said receiver, said channel receives said cable extending from said first connector; and
   a pole with a first end configured as a handle and a second end supporting said holder.

2. The apparatus of claim 1 wherein said first connector includes a first conductor and a second conductor, said first conductor protruding axially from said first connector, said first conductor biased away from said connector body, said second conductor electrically isolated from said first conductor, and said first and second conductors electrically connected to a pair of conductors in said cable.

3. The apparatus of claim 2 further including a second connector configured to electrically connect said first connector to the electrical device, said second connector having a first end with a third conductor coaxial to a fourth conductor, said third conductor defined by a recess relative to said fourth conductor, said recess configured to receive said first conductor of said first connector, and further including a magnet associated with one of said first connector and said second connector, said magnet inducing a magnetic attraction sufficient to pull said first conductor of said first connector into said recess such that said third conductor electrically connects with said first conductor and said fourth conductor electrically connects with said second conductor.

4. The apparatus of claim 3 wherein said magnetic attraction is sufficient to maintain an electrical connection between said first connector and said second connector with said cable suspended from said first connector.

5. The apparatus of claim 3 wherein said magnetic attraction has a strength insufficient to maintain an engagement between said first connector and said second connector when said cable is subjected to a tugging force.

6. The apparatus of claim 3 wherein said second connector is an adapter with a second end of said second connector configured to mate with a conventional power connector on the electrical device.

7. The apparatus of claim 1 wherein said first connector includes a first conductor and a second conductor, said first conductor defined by a recess relative to said second conductor, said recess configured to receive a third conductor projecting from said second connector, said second conductor configured to make electrical contact with a fourth conductor of said second connector, and said first connector and said second connector having a magnetic attraction sufficient to pull said recess onto said third conductor of said second connector such that said third conductor electrically connects with said first conductor and said fourth conductor electrically connects with said second conductor.

8. The apparatus of claim 1 wherein said zero-insertion force includes an attraction between said first connector and said second connector, whereby said attraction pulls said first and second connectors together.

9. An apparatus for connecting an electrical cable to an electrical device, said apparatus comprising:
   a first connector configured to make an electrical connection with a second connector associated with the electrical device, said first connector having a connector body;
   a cable electrically connected to said first connector;
   a holder having a receiver configured to engage a portion of said connector body of said first connector, said first connector releasably secured in said receiver by a weight of said first connector and a portion of said cable suspended from said first connector, said receiver releasing said first connector when said first connector is electrically connected to said second connector, said receiver including a pair of sidewalls, and, when said portion of said connector body is engaging said receiver, said pair of sidewalls are engaging said portion of said connector body therebetween, said receiver including a channel extending away from said pair of sidewalls, and, when said portion of said connector body is engaging said receiver, said channel receives said cable extending from said first connector; and
   a pole with a first end configured as a handle and a second end supporting said holder.

10. The apparatus of claim 9 wherein said holder further includes a view port through which an indicator on the electrical device is visible when said holder is proximate said second connector.

11. The apparatus of claim 9 wherein said first connector includes a first conductor and a second conductor, said first conductor protruding axially from said first connector, said first conductor biased away from said connector body, said second conductor electrically isolated from said first conductor, and said first and second conductors electrically connected to a pair of conductors in said cable.

12. The apparatus of claim 9 wherein said second connector includes a first end configured to electrically connect to said first connector, said second connector having a second end configured to electrically connect to the electrical device, said first connector and said second connector being magnetically attracted to each other, one of said first connector and said second connector having an axial conductor and an other one of said first connector and said second connector having a recess configured to receive said axial conductor in electrical connection, and said first connector and said second connector having a magnetic attraction therebetween sufficient to pull said axial conductor into said recess thereby engaging said first and second connectors.

13. The apparatus of claim 12 wherein said second connector is an adapter with said second end of said second connector configured to engage a conventional connector on the electrical device.

14. The apparatus of claim 9 wherein said first connector and said second connector have a magnetic attraction sufficient to pull said first connector and said second connector together to form an electrical connection therebetween.

15. The apparatus of claim 14 wherein said magnetic attraction is sufficient to maintain an electrical connection between said first connector and said second connector with said cable suspended from said connector.

* * * * *